United States Patent
Weldy et al.

[11] 3,722,477
[45] Mar. 27, 1973

[54] POULTRY LOADING APPARATUS

[76] Inventors: Levon R. Weldy, R.R. 3, Box 175; Olen Yoder, Jr., R.R. 2, Box 201, both of Goshen, Ind. 46526

[22] Filed: Mar. 11, 1971

[21] Appl. No.: 123,211

[52] U.S. Cl. .................................. 119/82, 198/139
[51] Int. Cl. ............................................ A01k 29/00
[58] Field of Search ............ 119/82; 198/87, 89, 139; 193/3, 38, 41

[56] References Cited

UNITED STATES PATENTS

| | | | |
|---|---|---|---|
| 3,420,211 | 1/1969 | Hartvickson | 119/82 |
| 2,815,849 | 12/1957 | Zumbrunnen | 198/139 |
| 3,389,780 | 6/1968 | Jerome | 119/82 X |
| 1,137,276 | 4/1915 | Norman | 119/82 |
| 1,247,114 | 11/1917 | Howard | 119/82 X |
| 2,799,387 | 7/1957 | Butcher, Sr. | 198/139 X |
| 3,452,718 | 7/1969 | Wight | 119/82 |
| 3,100,563 | 8/1963 | Biedess | 198/139 X |

Primary Examiner—Antonio F. Guida
Assistant Examiner—James H. Czerwonky
Attorney—Marmaduke A. Hobbs, Maurice W. Green and Kemon, Palmer & Estabrook

[57] ABSTRACT

An apparatus for loading poultry into compartments or coops in which a main conveyor section delivers poultry to a point adjacent the door of the compartment or coop and a retractable and extensible telescopic conveyor extension delivers the poultry first to the rear of the compartment or coop and then progressively outwardly toward the door as the compartment or coop is filled with poultry. The retractable and extensible conveyor operates on at least two planes different from the plane of the main conveyor section. The conveyor sections are preferably of the continuous belt type, and the belt is continuous from the main section to and throughout the extension section. The main conveyor section has a relatively rigid frame, and the extension section has a retractable and extensible section which may be tilted angularly with respect to the main section to permit effective positioning of the extension section in a compartment or coop. The apparatus also includes a control station movable independently of the conveyors during the poultry loading operation.

13 Claims, 13 Drawing Figures

INVENTOR.
LEVON WELDY &
OLEN YODER, JR
BY Hobbs & Green
ATTORNEYS

INVENTORS
LEVON WELDY &
OLEN YODER, JR
BY Hobbs & Green
ATTORNEYS

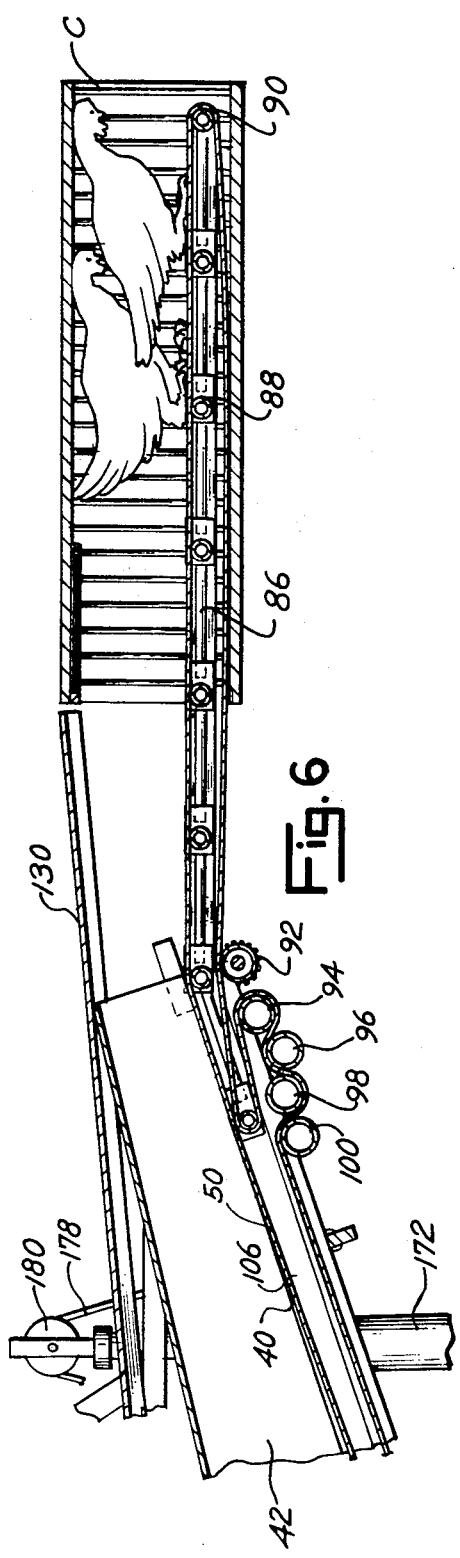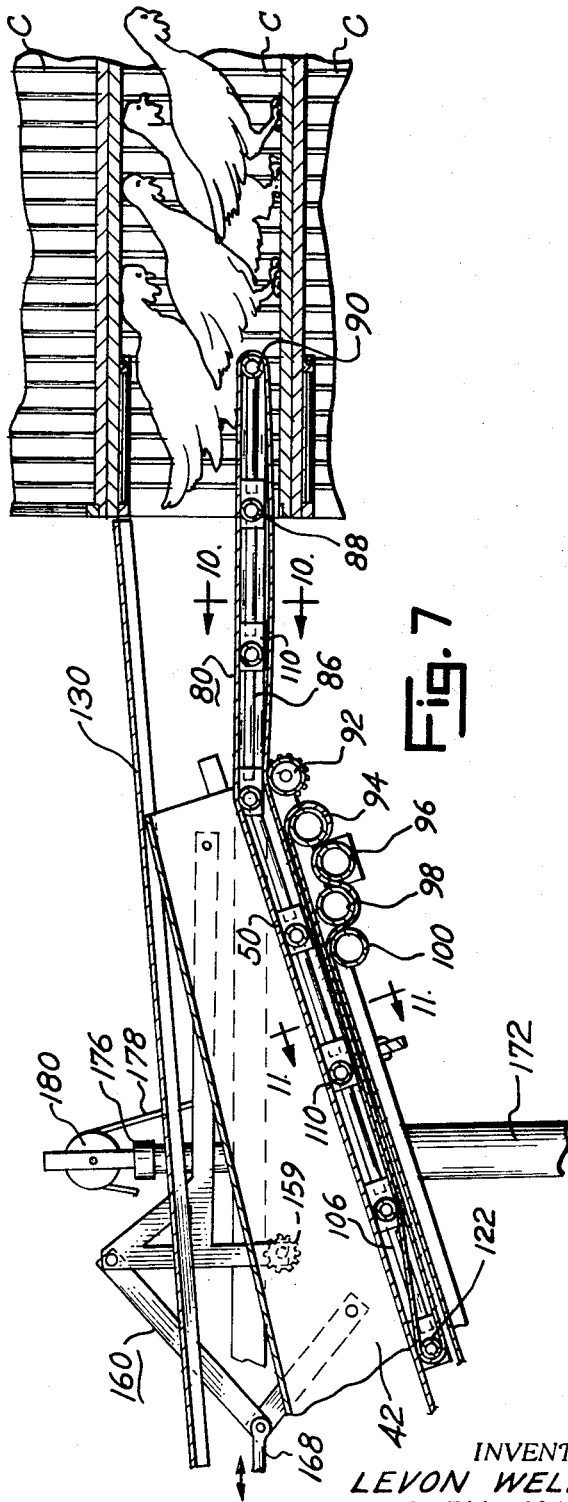

INVENTOR.
LEVON WELDY &
OLEN YODER, JR
BY Hobbs & Green
ATTORNEYS

POULTRY LOADING APPARATUS

In large turkey farm operations, the birds ready for the market are loaded in a series of vertically and horizontally arranged compartments or coops having doors opening along the sides of the truck for receiving the live birds. There are several types of commercial turkey loaders which utilize conveyors for lifting the turkeys from ground level to the level of each compartment being filled, where the birds are transferred from the conveyor to the compartment. In some types of loaders the turkeys must be transferred by hand from the conveyor to the compartments and pushed inwardly toward the rear of the compartment until the compartment is filled. In other types of loaders the birds are delivered directly to the door of the compartment and discharged into the compartment, but the turkeys tend to pile up at the entrance and must be pushed either by hand or by the incoming turkeys to the rear of the compartment as the compartment fills. Both the handling of the birds to transfer from the conveyor to the compartment and the pushing of birds to the rear of the compartment often result in bruising or other injury to the birds, as well as causing fright which may result in further injury to the birds. It is therefore one of the principal objects of the present invention to provide a poultry loading apparatus which conveys the birds from ground level to the compartment and then discharges the birds into the compartment, initially to the rear, and then progressively outwardly as the compartment is filled with the birds, and which performs the compartment filling operation without any handling or pushing of the birds at the discharge end of the conveyor.

Another object of the invention is to provide a poultry loading apparatus which includes an extensible and retractable conveyor section adapted to extend into the compartment near the rear side thereof and to retract therefrom as the compartment is filled without moving the apparatus from its loading position for any particular compartment, and which can be readily elevated to various compartment filling positions when the section is in its retracted position.

Still another object of the invention is to provide a poultry loading apparatus of the aforementioned type which can easily be controlled by an operator from a station near the discharge end of the conveyor apparatus to elevate the conveyor, and to extend and retract the section projecting into the compartments.

A further object is to provide a poultry loader which can be readily utilized under various conditions to perform the bird loading operation with a minimum of injury to the birds, and which can be easily transported from one operation to another.

Additional objects and advantages of the invention will become apparent from the following description and accompanying drawings, wherein:

FIGS. 6 and 7 are enlarged, fragmentary cross sectional views of the apparatus, the sections being taken on line 6—6 of FIG. 5, illustrating the manner in which the apparatus operates in filling a compartment or coop, the latter also being shown in cross section.

Figure 1:
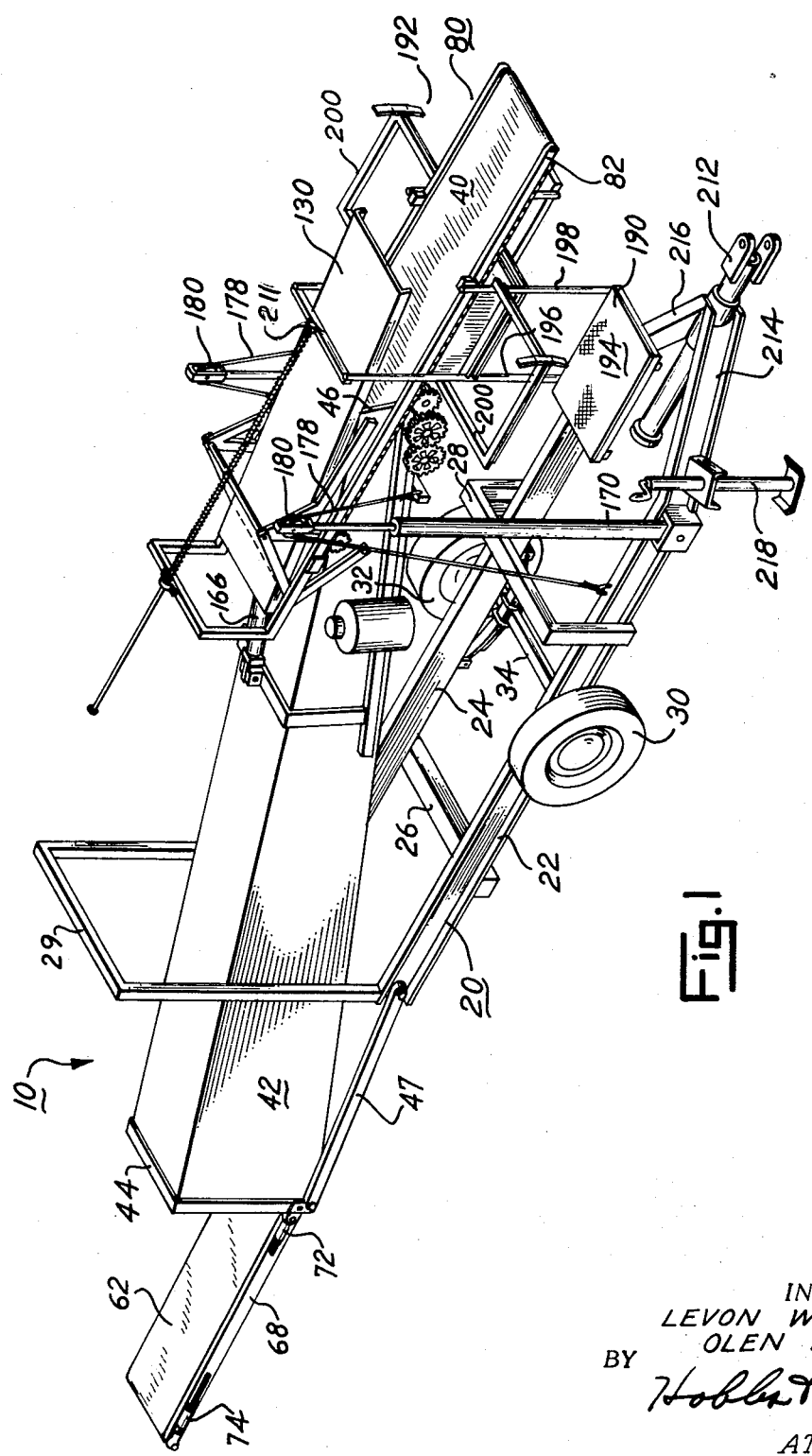
FIG. 1 is a perspective view of the present poultry loading apparatus.
Figure 2:
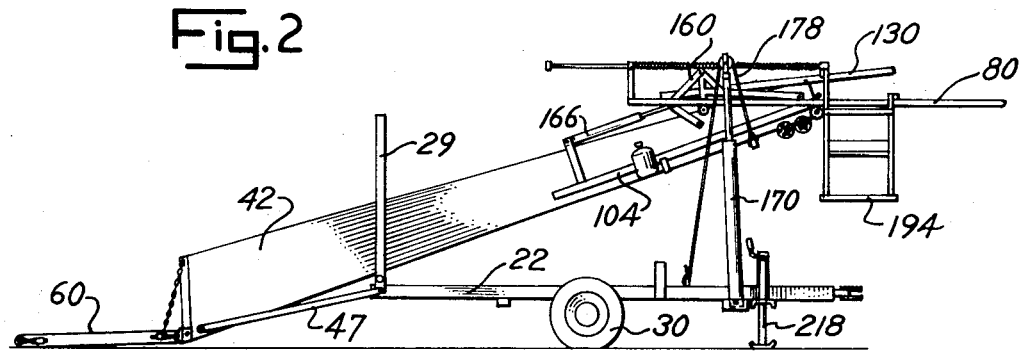
FIG. 2 is a side elevational view of the apparatus, showing it in operating position.

Referring more specifically to the drawings, numeral 10 indicates generally the present poultry loading apparatus, FIGS. 1 and 2 illustrating the apparatus in its operating position. The apparatus is designed to transport poultry, such as turkeys, from ground level to coops or compartments C, illustrated in FIGS. 6 and 7, mounted on a truck and having doors along the sides of the truck for receiving the turkeys, for example. The apparatus is positioned to deliver the turkeys to the compartments at different elevations and along different longitudinal positions of the truck. The compartments are conventional in construction and design and will not be described in further detail herein.

The apparatus includes a main frame 20 having side members 22 and 24 and cross members 26, 28 and 29 forming a rigid frame structure. The frame is mounted on an undercarriage, the one shown having two wheels 30 and 32 on axle 34. The main conveyor of the apparatus is indicated by numeral 40, and is enclosed in a chute 42 extending in operating position from a position near the ground to the approximate position of the compartment being loaded, but spaced therefrom. The chute is generally rectangular in cross section, and is preferably tapered from the inlet end 44 to the discharge end 46. The conveyor 40 consists of a continuous belt 50 trained at the lower end on a roller 52 and driven by a hydraulic motor 54 through chain and sprocket assembly 56. The lower end of chute 42 is supported by arms 47 and 48 connected to frame members 22 and 24, respectively, and to the opposite sides of chute 42. The chute is preferably constructed of sheet metal and is adapted to restrain the poultry as they are lifted on the conveyor 40.

In order to assist in loading the birds on main conveyor 40, an extension 60 is provided at the lower entrance end 44. This extension consists of a conveyor belt 62 trained on rollers 64 and 66, which in turn are supported by a generally rectangular frame 68. The conveyor belt 62 is driven by motor 54 through a sprocket and chain assembly 70. The tension on the belt is adjusted by adjustment means 72 and 74 at opposite ends of frame 68 on both sides of the extension frame.

Figure 13:
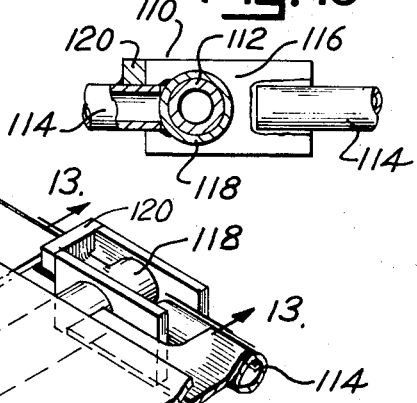
FIG. 13 is an enlarged fragmentary view showing a detail of a portion of the apparatus illustrated in FIG. 12, the section being taken on line 13-13 of the latter figure.
Figure 12:
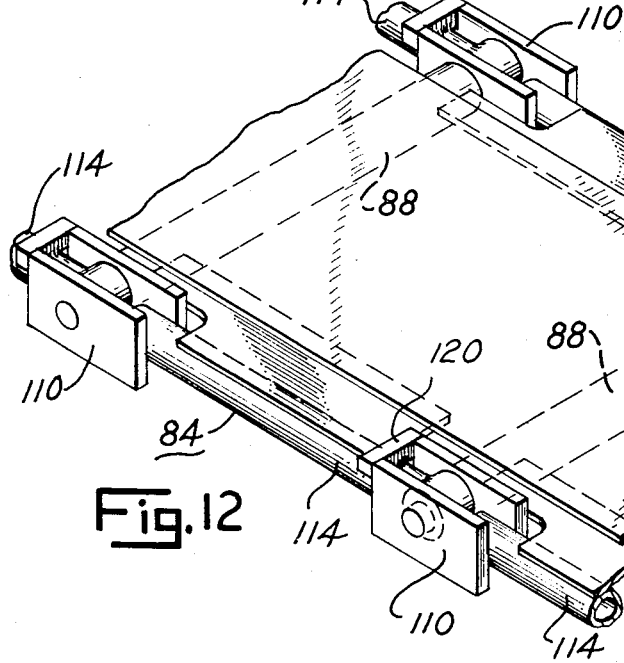
FIG. 12 is a fragmentary perspective view of the portion of the apparatus illustrated in FIG. 10.

The conveyor is provided with an extendable and retractable extension section 80, consisting of a reciprocable frame 82 having side members for supporting the outer end of the belt 50. Articulated frame members 84 and 86 support a plurality of rollers 88 and an end roller 90 on which the belt is trained. The lower side of the belt is trained over roller 92 and around rollers 94, 96, 98, and 100, roller 94 being driven by a hydraulic motor 102 which drives the entire main belt assembly. The articulated members 84 and 86 are adapted to slide inwardly and outwardly along tracks 104 and 106 to various positions as illustrated in FIGS. 6 and 7. The details of construction of the articulated members are illustrated in FIGS. 10 through 13, the two members being connected at joints 110 by cross bars 112. The sections of the articulated side members are pivoted relative to one another at the joints, one side element 114 being secured rigidly to a block 116 at one end, and at the other end pivotedly connected to cross bar 112 by a sleeve 118 to which the element is rigidly secured by welding. The movement of the element in the joint is restrained by a stop 120 secured to the upper side of the element and abutting against block 116 when two elements 114 are in alignment with each other, as illustrated in FIGS. 12 and 13. When the articulated members move inwardly along tracks 104 and 106, the sections of the articulated members move angularly with respect to one another as illustrated in FIG. 7, thus permitting the main belt to move smoothly along the bottom of chute 42. The main belt is trained on end roller 122 and is doubled back upon itself over drive roller 94, the doubled back portion extending and contracting as the extension 80 is moved inwardly and outwardly in the compartment or coop C.

Figure 4:
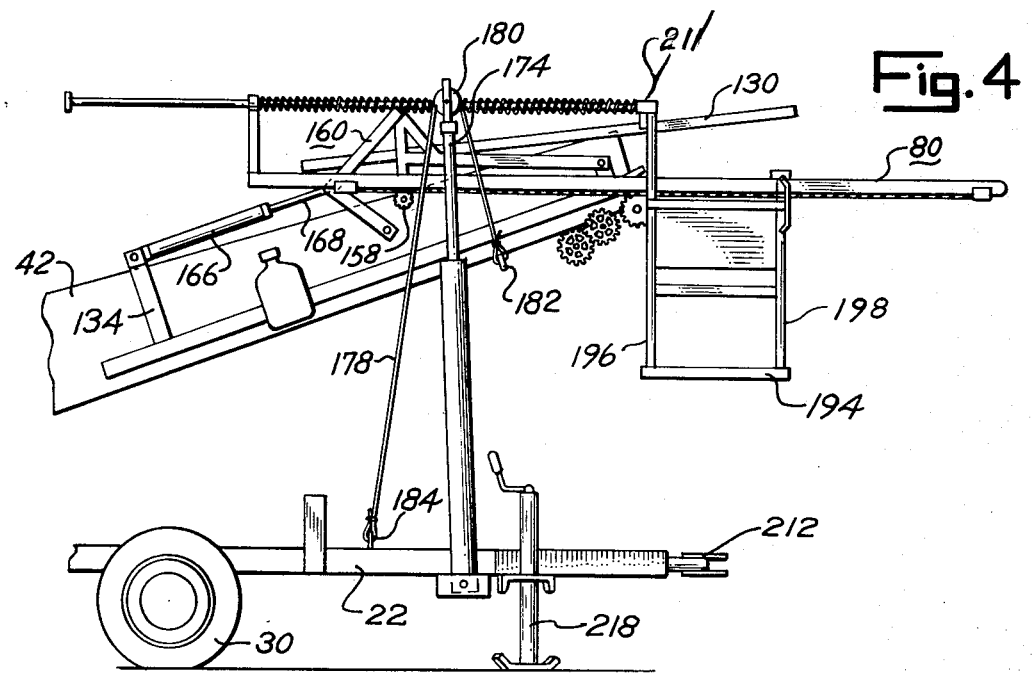
FIG. 4 is a fragmentary enlarged elevational view similar to that shown in FIG. 2.
Figure 5:
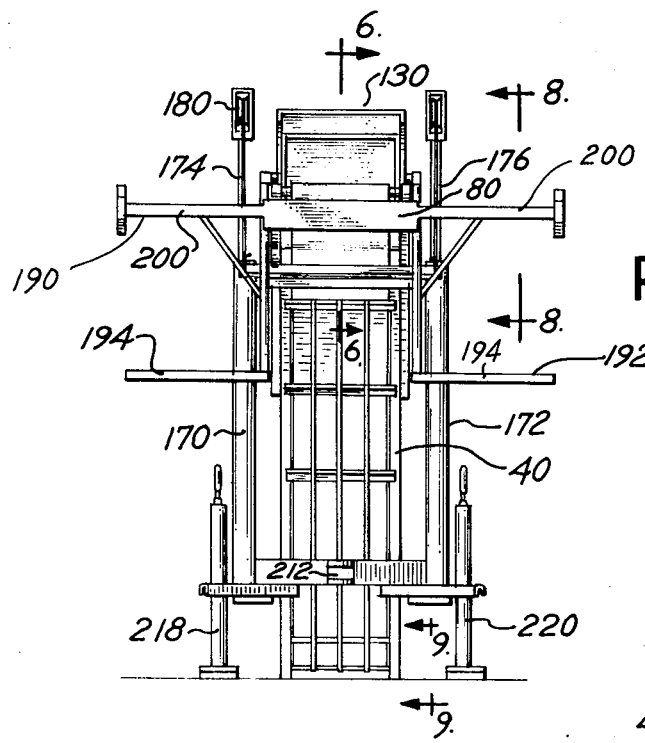
FIG. 5 is an elevational view of the right hand end of the apparatus as seen in the preceding figures.
Figure 8:
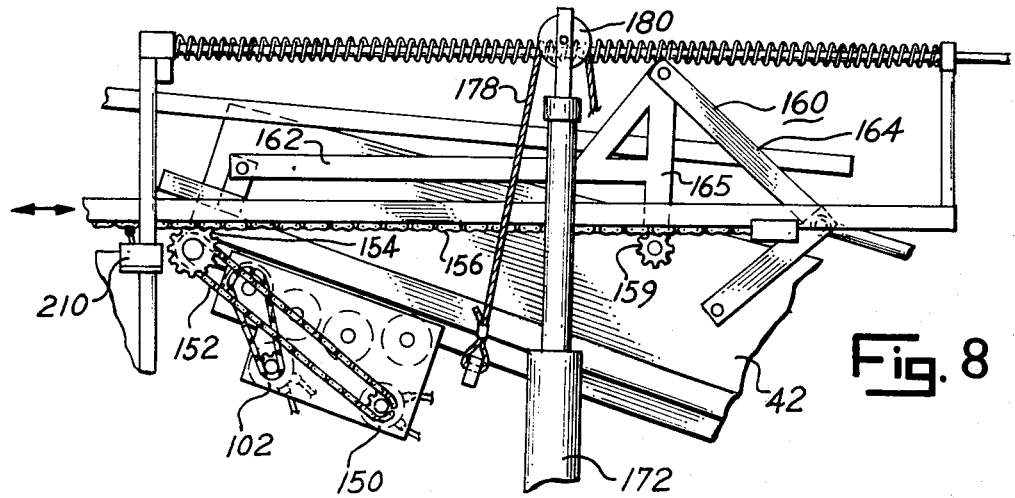
FIG. 8 is a fragmentary elevational view of the side of the apparatus opposite that shown in FIG. 4.
Figure 9:
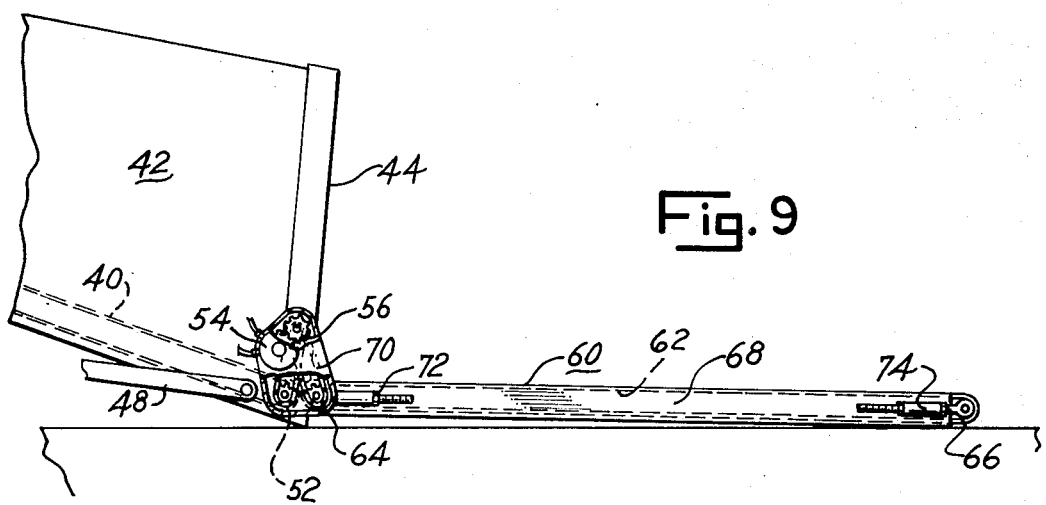
FIG. 9 is a fragmentary elevational view of the end of the apparatus on the left hand side as seen in FIGS. 2 and 3.
Figure 10:
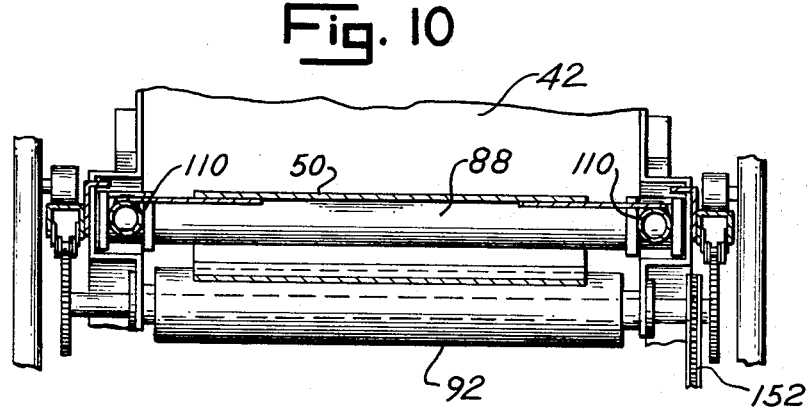
FIG. 10 is an enlarged cross sectional view taken on line 10 — 10 of FIG. 7.
Figure 11:
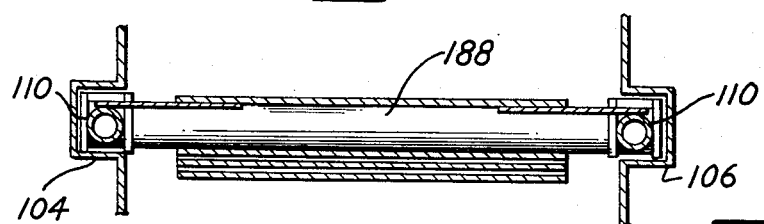
FIG. 11 is an enlarged cross sectional view taken on line 11—11 of FIG. 7.

An extension 130 of the chute is provided over the extension 80 in order to retain the birds in a generally squatting position as they move from the main chute along extension 80 into the compartment. The chute extension 130 is moved generally horizontally corresponding in position to the extended position of extension section 80. Extension section 80 is extended and retracted by a hydraulic motor 150 through chain and sprocket assembly 152 and a sprocket 154 meshing with a chain 156 on the under side of the side members of frame 82. The inner end of frame 82 is supported by gears 158 and 159 mounted on the lower part of the lever assembly indicated generally by numeral 160. The lever assembly includes a member 162 pivotedly attached to chute 42 and a double lever 164 on each side, the upper end of which is pivoted to the upper end of lever 165 and the lower end of which is pivoted to the side of chute 42. A hydraulic cylinder 166 is connected by piston rod 168 to levers 164 for raising and lowering support gears 158 and 159. Movement of the piston in the right hand direction as shown in FIG. 4 results in raising the gears 158 and 159, thereby tilting frame 82 forwardly, i.e. to normally maintain the frame in a horizontal position as the forward end of the conveyor chute is raised.

The chute 42 and conveyor belt 50 and the extension 80 are raised bodily by a pair of hydraulic cylinders 170 and 172 through piston rods 174 and 176, respectively, the upper ends of each piston rod being connected to the bottom of the chute assembly by a cable 178 trained over a pulley 180 and connected to a bar 182 rigidly secured to the under side of the chute assembly. The long end of the cable is rigidly connected by an eye 184 to the respective frame members 22 and 24.

The apparatus can most effectively be operated and the turkeys or other poultry directed to the proper place from stands or stations 190 and 192 on opposite sides of extension 80, each stand consisting of a platform 194 supported by downwardly extending frame members 196 and 198 attached to the upper end of the frame supporting the chute. A guard rail 200 is provided above each platform and is rigidly secured to members 196 and 198. Extension section 80 moves relative to the two stations so that the stations can be placed in close proximity to the compartments to be filled, and the extension 80 operated independently of the stations. The hydraulic motors and cylinders are operated by any suitable hydraulic system, not shown in detail, from operating control levers mounted on or near station 192, the control lever system being shown merely schematically at numeral 210. The two stations and extension 130 are supported by and movable longitudinally relative to frame 82 and are constantly urged toward, and preferably against, the front of the coop or compartment by a spring and frame assembly 211. Thus, the operator can stand at station 192 in close proximity to the coop and effectively control and direct the complete loading operation.

Since the apparatus is transportable, a draw bar or hitch 212 is connected to angularly extending frame members 214 and 216, which in turn are connected to frame members 22 and 24. The conveyor 40 is lowered by cylinders 170 and 172 for transporting the loader, as viewed in FIG. 3, and raised by the cylinders for the loading position as illustrated in FIGS. 1 and 2. After the unit has been set up for operation, one or more stabilizing jacks 218 and 220 are used preferably along the front portion of the frame, as illustrated in FIGS. 1 through 5.

In the operation of the poultry loading apparatus, the apparatus is set up in operating position in the manner illustrated in FIGS. 1, 2, 6 and 7, positioned at right angles to the side of the truck being loaded, the truck normally containing horizontal and vertical rows of compartments on both sides of the bed with the doors of the compartments facing outwardly. With the forward end of chute 42 and extension section 80 in the raised position, supported by hydraulic cylinders 170 and 172, and with the extension section 80 projecting into the compartment to a point near the rear side thereof, as illustrated in FIG. 6, hydraulic motor 54 is placed in operation, thus driving conveyor belts 50 and 62. With the belts in operation, and the extension 80 in position in the compartments, turkeys or other poultry are placed on conveyor section 60 at entrance 44 and are carried by belt 50 through chute 42 onto extension 80 and thence into compartments C near the rear end thereof. As the turkeys are discharged at the rear end of the compartment, the operator gradually withdraws the extension from the compartment by the operation of motor 150, thus delivering the turkeys to the back portion of the compartment and continually outwardly as the turkeys are delivered to the compartment. As the frame 82 is retracted, the articulated support members 84 and 86 follow tracks 104 and 106 downwardly along the edges of the main conveyor belt, thereby always maintaining a smooth movement of the conveyor belt from the chute onto extension 80. The movement of the articulated members is made possible by the joint between members 114 as seen in FIGS. 12 and 13.

When the extension is to be projected into a compartment, the articulated support members move outwardly from tracks 104 and 106 along the frame members 82 on opposite sides of extension 80 to place the forward end of the extension at any desired location in the compartment. The retracting operation is controlled by the operator on station 192 by the operation of hydraulic motor 150 through chain and sprocket assembly 152 and chain 156 on the under side of frame 82 of the extension section. As the compartment approaches its full complement of turkeys, the outer end of extension 80 is positioned near the entrance of the compartment.

Figure 3:
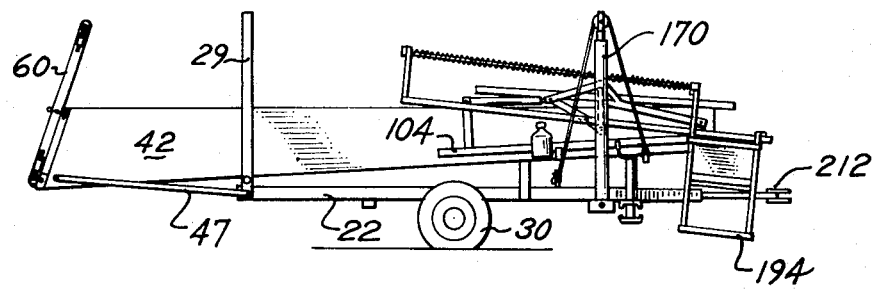
FIG. 3 is a side elevational view of the loader apparatus showing it in its folded position for transporting from one location to another.

When the compartment is completely filled, the extension is fully withdrawn and the door of the compartment closed. Assuming that the next compartment to be filled is directly above the filled compartment, hydraulic cylinders 170 and 172 are operated to lift the forward end of the chute to a position where the forward end of extension 80 is in position to extend inwardly into the empty compartment. The extension is then leveled by the operation of cylinder 166, which raises supporting gears 158 and 159 on lever assembly 160. The adjacent verticle tiers are reached for loading normally by moving the truck on which the compartments are loaded forwardly or rearwardly. After the loading operation has been completed and the apparatus is to be moved or stored, section 80 is retracted inwardly and section 60 is folded upwardly as illustrated in FIG. 3, thus placing the apparatus in a compact position for being towed using hitch 212, after the stabilizing jacks 218 and 220 have been retracted from the ground.

While only one embodiment of the present poultry loading apparatus has been described in detail herein, various changes and modifications may be made without departing from the scope of the invention.

We claim:

1. An apparatus for loading poultry into a compartment or coop having a side door, comprising a main belt conveyor section having a poultry receiving end and discharge end, and a telescopic belt conveyor section extensible and retractable on at least two planes different from the plane of said main conveyor section and extending forwardly from the discharge end of said main conveyor section for delivering the poultry to the rear of the compartment or coop and then progressively outwardly toward said door as the compartment or coop is filled with poultry, and means for tilting portions of said second mentioned conveyor section angularly about a transverse horizontal axis relative to said main conveyor section.

2. An apparatus for loading poultry as defined in claim 1 in which a main frame supports said main conveyor section and a reciprocable frame mounted on said main frame supports said extension section and being tiltable angularly with respect to said first mentioned frame.

3. An apparatus for loading poultry as defined in claim 1 in which said main and extensible conveyor sections include a single continuous belt for both sections.

4. An apparatus for loading poultry as defined in claim 2 in which a track means is provided along each side of said reciprocable frame, said extensible and retractable belt conveyor section comprising an articulated structure supporting said conveyor belt therein.

5. An apparatus for loading poultry as defined in claim 3 in which said belt is continuous and smooth between the two conveyor sections on the upper sides thereof and is folded upon itself on the under side to permit extension and retraction of the forward section while maintaining the smooth conveyor upper surface.

6. An apparatus for loading poultry as defined in claim 2 in which a power means moves said extensible frame.

7. An apparatus for loading poultry as defined in claim 1 in which said first mentioned conveyor section is enclosed in a chute-like structure, and a station is provided at the discharge end thereof for an operator of the apparatus.

8. An apparatus for loading poultry as defined in claim 7 in which a conveyor section is provided at the receiving end of said main belt conveyor for delivering poultry to the entrance of the chute-like structure.

9. In an apparatus for loading poultry into a compartment or coop having a side door: a main frame, a telescopic belt conveyor mounted on said frame and having a discharge end section extensible and retractable on at least two planes different from the plane of said main conveyor section, means for extending said discharge section through said door to the rear part of the compartment or coop for delivering poultry to the rear of said compartment or coop and then progressively withdrawing said discharge section outwardly towards said door as the compartment or coop is filled with poultry, and means for tilting portions of said discharge section angularly about a transverse horizontal axis relative to said main conveyor section.

10. An apparatus for loading poultry as defined in claim 9 in which said conveyor is of the continuous belt type, and has a continuous upper surface and a lower surface folded upon itself for retracting and extending the discharge end section of the conveyor.

11. An apparatus for loading poultry as defined in claim 10 in which the discharge end section is movable angularly on the horizontal axis with respect to the remainder of the conveyor.

12. In an apparatus for loading poultry into a compartment or coop having a side door: a main frame, a conveyor mounted on said main frame for extending to a point near the side door of the compartment or coop, a station for controlling the apparatus, a frame supporting said station, and means for independent-ly moving said frame, said frame being movable relative to said conveyor toward and away from the compartment or coop for positioning said station adjacent to the side door during the poultry loading operation.

13. An apparatus as defined in claim 12 in which said independent moving means is connected to said main frame.

* * * * *